United States Patent [19]
Suzuki

[11] Patent Number: 5,642,224
[45] Date of Patent: Jun. 24, 1997

[54] ZOOM LENS SYSTEM WITH VIBRATION REDUCTION FUNCTION

[75] Inventor: Kenzaburo Suzuki, Tokyo, Japan

[73] Assignee: Nikon Corporation, Tokyo, Japan

[21] Appl. No.: 573,409

[22] Filed: Dec. 15, 1995

Related U.S. Application Data

[62] Division of Ser. No. 245,033, May 17, 1994.

[30] Foreign Application Priority Data

May 31, 1993  [JP]  Japan ................................. 5-149726

[51] Int. Cl.$^6$ ............................ G02B 27/64; G02B 15/14
[52] U.S. Cl. ........................... 359/557; 359/554; 359/676; 359/685
[58] Field of Search ........................... 359/554–557, 359/676–690

[56] References Cited

U.S. PATENT DOCUMENTS

| | | | |
|---|---|---|---|
| 4,844,602 | 7/1989 | Kitagishi et al. | 359/557 |
| 4,907,868 | 3/1990 | Kitagishi et al. | 359/557 |
| 4,974,950 | 12/1990 | Yamazaki et al. | 359/557 |
| 5,121,978 | 6/1992 | Maruyama | 359/557 |
| 5,172,276 | 12/1992 | Ueyama et al. | 359/813 |
| 5,325,233 | 6/1994 | Nakatsuji et al. | 359/683 |

*Primary Examiner*—Thong Nguyen
*Attorney, Agent, or Firm*—Shapiro and Shapiro

[57] ABSTRACT

A zoom lens system with vibration reduction function includes, in succession from the object side, a first lens unit having positive refractive power, a second lens unit movable along a direction across the optical axis thereof and having negative refractive power, a third lens unit, a fourth lens unit having positive refractive power, a fifth lens unit having negative refractive power, during the focal-length change from the wide angle end to the telephoto end, the spacing between the first lens unit and the second lens unit being increased, the spacing between the second lens unit and the third lens unit being varied, and the spacing between the fourth lens unit and the fifth lens unit being decreased, and a vibration reduction device for moving the second lens unit along the direction across the optical axis, the stabilization of an image on an image plane being accomplished by the movement of the second lens unit caused by the vibration reduction device.

75 Claims, 3 Drawing Sheets

ZOOM LENS SYSTEM WITH VIBRATION REDUCTION FUNCTION

This is a division of application Ser. No. 08/245,033 filed May 17, 1994.

BACKGROUND OF THE INVENTION

1. Field of the Invention

This invention relates to a zoom lens system with the function of preventing image shake, and particularly is suitable for a photographic zoom lens system.

2. Related Background Art

There are known a zoom lens system as disclosed in U.S. Pat. No. 5,270,857 wherein any lens unit in a zoom lens system comprised of two or more lens units is displaced in a direction perpendicular to the optical axis thereof to correct image shake, and a zoom lens system as disclosed in U.S. Pat. No. 5,040,881 wherein some lenses in a first lens unit fixed during zooming are displaced in a direction perpendicular to the optical axis thereof to correct image shake.

However, in the prior art as described above, it has been impossible to secure a back focal length sufficient for a single-lens reflex camera (SLR) and thus, it has been impossible to realize a desired great zoom ratio. Therefore, the zoom lens systems as described above are unsuitable as lenses for a compact and high-performance 35 mm photographic SLR.

SUMMARY OF THE INVENTION

So, it is an object of the present invention to realize a sufficient back focal length and a great zoom ratio and to provide a compact and high-performance zoom lens system with image vibration reduction function.

To achieve the above object a zoom lens system with vibration reduction function according to an embodiment of the present invention is designed to include, in succession from the object side:

a first lens unit having positive refractive power;

a second lens unit movable along a direction across the optical axis thereof and having negative refractive power;

a third lens unit;

a fourth lens unit having positive refractive power;

a fifth lens unit having negative refractive power;

during the focal-length change from the wide angle end to the telephoto end, the spacing between said first lens unit and said second lens unit being increased, the spacing between said second lens unit and said third lens unit being varied, and the spacing between said fourth lens unit and said fifth lens unit being decreased; and a vibration reduction device for moving said second lens unit along a direction across said optical axis;

the stabilization of an image on an image plane being accomplished by the movement of said second lens unit caused by said vibration reduction device.

Also, to achieve the above object, a zoom lens system with vibration reduction function according to another embodiment of the present invention is designed to include, in succession from the object side:

a first lens unit having positive refractive power;

a second lens unit movable along a direction across the optical axis thereof and having negative refractive power;

a lens unit disposed subsequently to said second lens unit; and a vibration reduction device for moving said second lens unit so as to cross said optical axis;

during the focal-length change from the wide angle end to the telephoto end, the spacing between said first lens unit and said second lens unit being increased.

Also, to achieve the above object, a zoom lens system with vibration reduction function according to still another embodiment of the present invention is designed to include, in succession from the object side:

a first lens unit having positive refractive power;

a second lens unit movable along a direction across the optical axis thereof to stabilize an image on an image plane and having negative refractive power;

a third lens unit;

a fourth lens unit having positive refractive power; and a fifth lens unit having negative refractive power;

during the focal-length change from the wide angle end to the telephoto end, the spacing between said first lens unit and said second lens unit being increased, the spacing between said second lens unit and said third lens unit being varied and the spacing between said fourth lens unit and said fifth lens unit being decreased.

DETAILED DESCRIPTION OF THE INVENTION

Figure 1:
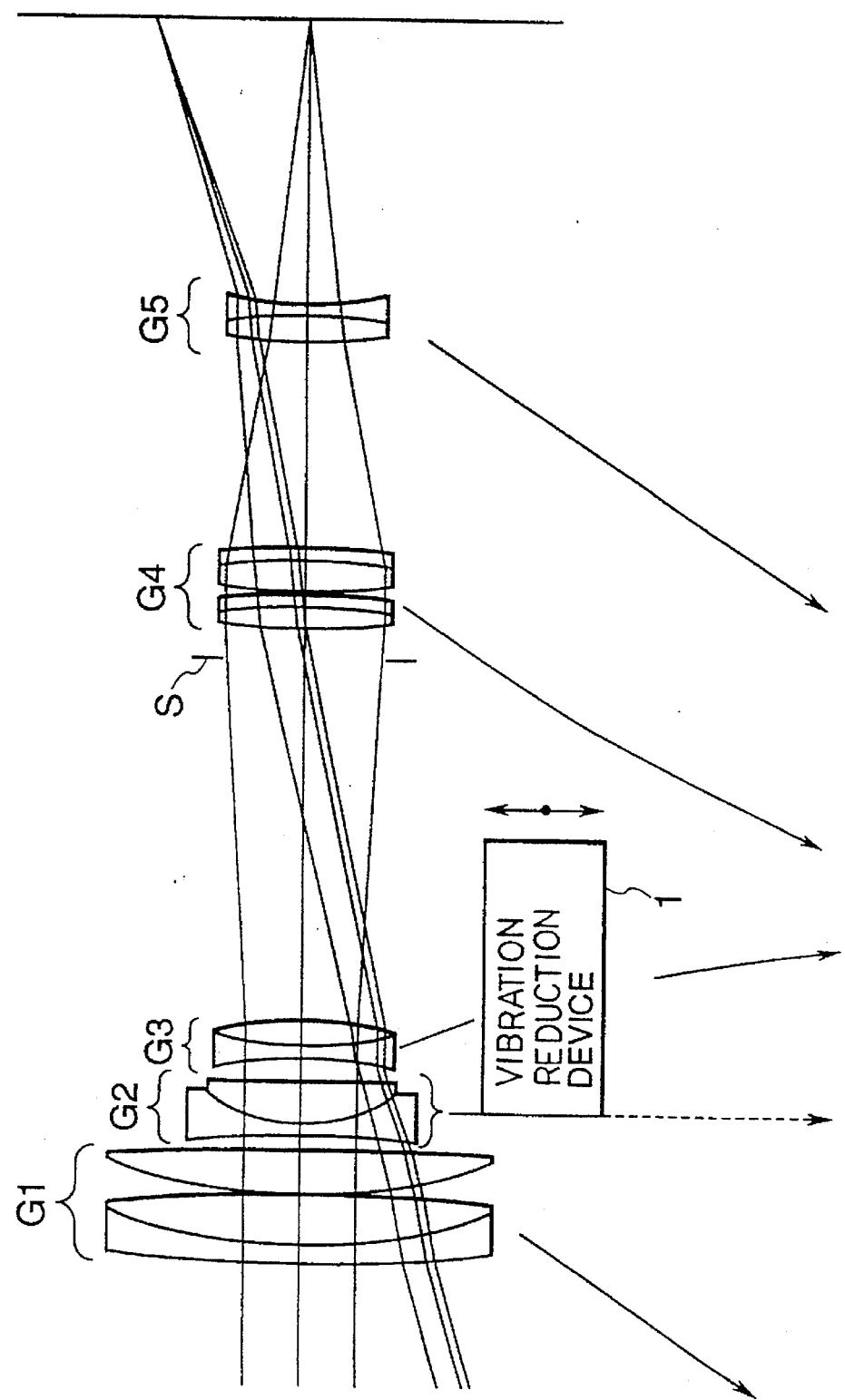
FIG. 1 shows the construction of a zoom lens system according to a first embodiment of the present invention.

The present invention, so as to be suitable particularly for a 35 mm photographic telephoto zoom lens, is directed to a zoom lens provided, in succession from the object side, with at least a first lens unit G1 having positive refractive power and a second lens unit G2 having negative refractive power. More specifically, the present invention basically adopts a zoom lens of five-unit construction provided, in succession from the object side, with a first lens unit G1 having positive refractive power, a second lens unit G2 having negative refractive power, a third lens unit G3 having positive or negative refractive power, a fourth lens unit G4 having positive refractive power, and a fifth lens unit G5 having negative refractive power.

With attention paid to the features and advantages of a zoom lens of such a five-unit construction type, the action thereof will hereinafter be described.

By sufficiently making the most of the features of a multi-unit construction called the five-unit construction, it is possible to realize a telephoto zoom lens which is compact and excellent in imaging performance and which can be applied for a higher magnification.

The zoom lens of five-unit construction as described above has the merit that the full length thereof can be shortened, and particularly at the wide angle end, the full length can be shortened. Also, multi-unit construction ensures a great degree of freedom of the manner of movement (movement locus) of the lens units and a great degree of freedom of aberration correction and therefore, an excellent imaging performance can be secured even though the zoom ratio is great.

Particularly, in a zoom lens of a type in which, as in the zoom lens of the present invention, the full length is short at the wide angle end and the full length stretches during the focal-length change by the zooming from the wide angle end to the telephoto end, the full length at the wide angle end and the weight of the whole zoom lens can be reduced, as compared with the prior-art telephoto zoom lens of the four-unit afocal type. Also, the heights of rays of light passing through the respective lens units at the wide angle end become small and therefore, aberrations occurring in the respective lens units become small, and this is particularly advantageous during the aberration correction at the wide angle side. Further, since the number of the constituent lens units is great, the degree of freedom of the selection of refractive power distribution increases and a back focal length sufficient for single lens reflex can be secured easily.

Generally, it is often the case with telephoto zoom lenses that the first lens unit is comprised of the largest lens unit and is axially moved toward the object side during focusing. Therefore, displacing the first lens unit in a direction orthogonal to the optical axis thereof to thereby provide a correcting optical system for vibration reduction results in the bulkiness of a holding mechanism and a driving mechanism, and this is not preferable. Again in the zoom lens of the present invention, it is not preferable to use the first lens unit as a correcting optical system for vibration reduction.

Also, if a lens unit like the third lens unit or the fifth lens unit which is greatly moved along the optical axis during focal-length change is used as a correcting optical system for vibration reduction, the mechanism of the lens unit will become complicated, and this is not preferable.

So, in the zoom lens of the present invention, for the simplification of the mechanism of the whole lens system, displacement means 1 for effecting vibration reduction is provided in the second lens unit. It is preferable that the second lens unit be fixed during zooming.

Also, in order to intercept unnecessary rays of light incident when the second lens unit is displaced across the optical axis for the purpose of vibration reduction, it is preferable to provide a fixed flare stop on the optical axis discretely from an aperture stop.

Further, in the above-described construction of the present invention, it is preferable that the following conditional expressions (1) to (3) be satisfied:

$$0.3 < f1/(fW \cdot fT)^{1/2} < 1.5 \quad (1)$$

$$0.3 < |f2|/f1 < 5 \quad (2)$$

$$0.3 < |f2|/fW < 3 \quad (3)$$

where f1: the focal length of the first lens unit G1;

f2: the focal length of the second lens unit G2;

fW: the focal length of the whole zoom lens system at the wide angle end;

fT: the focal length of the whole zoom lens system at the telephoto end.

Conditional expression (1) prescribes an appropriate range regarding the focal length fW of the zoom lens at the wide angle end, the focal length fT of the zoom lens at the telephoto end, and the focal length f1 of the first lens unit G1.

If the upper limit value of conditional expression (1) is exceeded, the full length at the telephoto end will become great and it will become impossible to realize a compact zoom lens and also, the deficiency of the quantity of marginal light at the telephoto end and especially an increase in the lens diameter of the first lens unit G1 will result, and this is not preferable. To realize a more compact zoom lens, it is preferable that the upper limit value be 1.3 or less.

If conversely, the lower limit value of conditional expression (1) is exceeded, the focal length f1 of the first lens unit G1 will become too small and the spherical aberration at the telephoto end will tend to be under-corrected and the fluctuation of curvature of image field during the focal-length change by zooming will increase remarkably. Also, the magnitude of the imaging magnification at the telephoto end by the second lens unit G2 and subsequent lens units will become excessively great and on-axis chromatic aberration created in the first lens unit G1 will be enlarged, and it will become impossible to secure a good imaging performance. To secure a better imaging performance, it is preferable that the lower limit value be 0.6 or greater.

Conditional expression (2) is a condition which prescribes an appropriate rate of refractive power on the basis of the focal length f1 of the first lens unit G1 and the focal length f2 of the second lens unit G2.

If the upper limit value of conditional expression (2) is exceeded, the spherical aberration at the telephoto end will be liable to become excessively great to the positive side and the fluctuation of coma during focal-length change will become great, and the distortion at the telephoto side will greatly move toward the negative side. Also, at the wide angle end, introversive coma will be created in the rays of light under the principal ray of light and a good imaging performance could not be obtained. If the upper limit value is 2 or less, it will become possible to secure a better imaging performance.

If conversely, the lower limit value of conditional expression (2) is exceeded, the spherical aberration at the telephoto end will be liable to become excessively great and the fluctuation of coma during focal-length change will become great, and the distortion at the telephoto side will greatly move toward the positive side. Also, at the wide angle end, introversive coma will be created in the rays of light under the principal ray of light and a good imaging performance will not be obtained. If the lower limit value is 0.5 or greater, it will be possible to secure a better imaging performance.

Conditional expression (3) prescribes an appropriate rate of the magnitude of the focal length f2 of the second lens unit G2 to the focal length fW of the whole zoom lens system at the wide angle end.

If the upper limit value of conditional expression (3) is exceeded, the focal length f2 of the second lens unit G2 will become too great. Accordingly, it will become difficult to secure the back focal length at the wide angle end when for the sake of convenience to explain the meaning of this conditional expression, it is assumed that the third lens unit G3 and subsequent lens units maintain a predetermined state. Also, the fluctuation of curvature of image field and the fluctuation of coma during the focal-length change by zooming will become too great, and this is inconvenient. Further, if the refractive power of the second lens unit G2 for effecting vibration reduction is too small (the focal length of this lens unit is too great), the desired amount of displacement (orthogonal to the optical axis) for displaying a predetermined vibration reduction performance will become too great with a result that the mechanism will become bulky or complicated, and this is inconvenient.

If conversely, the lower limit value of conditional expression (3) is exceeded, the focal length f2 of the second lens unit G2 will become too small. Accordingly, when for the sake of convenience to explain the meaning of this conditional expression, it is assumed that the third lens unit G3 and subsequent lens units maintain a predetermined state, the full length at the wide angle end will become great and the lens diameter of the fifth lens unit G5 will become large, and this is inconvenient. Also, if the refractive power of the second lens unit G2 which is the correcting lens unit for vibration reduction is too great (the focal length of this lens unit is too small), the desired amount of displacement (orthogonal to the optical axis) for displaying a predetermined vibration reduction performance will become too small with a result that the control of the desired amount of displacement will become difficult, and this is inconvenient.

To secure a better performance, it is preferable that in addition to conditional expressions (1) to (3), the following conditional expressions (4) and (5) be satisfied:

$$\Delta S/f2 < 0.1 \qquad (4)$$

$$0.2 < R21/f2 < 20 \qquad (5)$$

where f2 : the focal length of the second lens unit G2;

$\Delta S$: the magnitude of the maximum amount of displacement during the vibration reduction of the second lens unit G2;

R21: the radius of curvature of that surface of the second lens unit G2 which is most adjacent to the object side.

Conditional expression (4) prescribes the appropriate range of the ratio of the magnitude $\Delta S$ of the maximum amount of displacement (orthogonal to the optical axis) during the vibration reduction of the second lens unit G2 to the magnitude of the focal length f2 of the second lens unit G2.

If the upper limit value of conditional expression (4) is exceeded, the maximum amount of displacement of the second lens unit G2 will become too great with a result that the fluctuation of aberrations during vibration reduction will also become great, and this is inconvenient. Particularly, the difference in the direction of the optical axis between the best image plane in the meridional direction at the marginal position on the image plane and the best image plane in the sagittal direction will widen, and this is inconvenient.

If the upper limit value of conditional expression (5) is exceeded, the spherical aberration at the telephoto end will become excessively great to the positive side, and at the wide angle end, introversive coma will be created in the rays of light under the principal ray of light, and this is inconvenient. It will also be impossible to obtain a good imaging performance during vibration reduction. If conversely, the lower limit of conditional expression (5) is exceeded, the distortion at the telephoto end will be liable to become excessively great to the positive side, and at the wide angle end, extroversive coma will be created in the rays of light under the principal ray of light, and this is inconvenient. It will also be impossible to obtain a good imaging performance during vibration reduction.

When the second lens unit G2 is actually designed, it is preferable that in addition to the aforementioned conditions, the following conditional expressions (6) and (7) be satisfied:

$$1.52 < N_- \qquad (6)$$

$$0.1 < f2 - f2 \qquad (7)$$

where $N_-$: the refractive index of the concave lens in the second lens unit G2 which is most adjacent to the object side;

f2 $-$: the focal length of the concave lens in the second lens unit G2 which is most adjacent to the object side.

If the lower limit value of conditional expression (6) is exceeded, the distortion at the telephoto end will be liable to become excessively great to the positive side and the fluctuations of various aberrations during focal-length change, especially the fluctuation of distortion, will become great, and this is inconvenient. Also, Petzval sum will become liable to shift to the positive side, and this is inconvenient.

On the other hand, if the upper limit value of conditional expression (7) is exceeded, the spherical aberration at the telephoto end will be liable to become excessively great to the negative side, and at the wide angle end, extroversive coma will be created in the rays of light under the principal ray of light, and this is inconvenient. It will also be impossible to obtain a good imaging performance during vibration reduction.

If conversely, the lower limit value of conditional expression (7) is exceeded, the distortion at the telephoto end will be liable to become excessively great to the negative side, and at the wide angle end, introversive coma will be created in the rays of light under the principal ray of light, and this is inconvenient. Further, the fluctuation of curvature of image field during focal-length change will become great, and this is inconvenient. It will also be impossible to obtain a good imaging performance during vibration reduction.

More specifically, it is preferable that the second lens unit G2 comprise a cemented lens consisting, in succession from the object side, of a concave lens and a convex lens, and it is preferable that in addition to the aforementioned conditions, the following conditional expressions (8) to (10) be satisfied:

$$N_+ < 1.55 \qquad (8)$$

$$-2 < q < 0 \qquad (9)$$

$$Z/T < 4 \qquad (10)$$

where $N_+$: the refractive index of the convex lens;

q: the shape factor of the cemented lens;

T: the magnitude of the amount of movement of the second lens unit G2 during vibration reduction;

Z: the magnitude of the amount of movement of the image corresponding to the amount of movement of the second lens unit G2.

When the radius of curvature of the object side lens surface of the cemented lens is ra and the radius of curvature of the image side lens surface of the cemented lens is rb, the shape factor q is expressed by $$q = (rb + ra)/(rb - ra).$$

Conditional expression (10) prescribes the appropriate ratio of the magnitude of the amount of movement of the second lens unit G2 to the magnitude of the corresponding amount of movement of the image so that the control of the minute amount of displacement of the image may become possible. To obtain a better imaging performance, it is preferable that the upper limit value of conditional expression (10) be 2.

Further, it is preferable that in addition to the aforementioned conditions, the following conditional expression (11) be satisfied:

$$0.5 < |f4|/|f5| < 2 \quad (11)$$

where f4: the focal length of the fourth lens unit G4;
f5: the focal length of the fifth lens unit G5.

If the upper limit value of conditional expression (11) is exceeded, the astigmatism at the wide angle end will become great, and at the wide angle end and the telephoto end, distortion will greatly move toward the positive side and Petzval sum will become liable to shift to the negative side, and this is inconvenient.

If the lower limit value of conditional expression (11) is exceeded, at the wide angle end and the telephoto end, distortion will become very great to the negative side and coma will also be created greatly, and this is inconvenient.

The third lens unit G3 can obtain a good performance if it is a lens unit having positive refractive power or a lens unit having negative refractive power. However, to secure a better imaging performance, it is preferable when the third lens unit G3 has positive refractive power that the following conditional expression (12) be satisfied:

$$0.6 < f3/fW < 2 \quad (12)$$

where f3: the focal length of the third lens unit G3;
fW: the focal length of the whole zoom lens system at the wide angle end.

If the upper limit value of conditional expression (12) is exceeded, spherical aberration will become very great to the positive side at the telephoto end and the lens diameters of the fourth lens unit G4 and subsequent lens unit will become large, and this is inconvenient. Also, Petzval sum will become liable to shift to the negative side, and this is inconvenient.

If conversely, the lower limit value of conditional expression (12) is exceeded, at the telephoto end, spherical aberration will become very great to the negative side and coma will be created, and this is inconvenient. Also, the back focal length at the wide angle end will be liable to become short, and this is inconvenient.

On the other hand, where the third lens unit G3 has negative refractive power, it is preferable in order to secure a better imaging performance that the following conditional expression (13) be satisfied:

$$1 < |f3|/fW < 2.5 \quad (13)$$

If the upper limit value of conditional expression (13) is exceeded, the back focal length at the wide angle end will be liable to become short and the fluctuation of curvature of image field and the fluctuation of coma will become great during focal-length change, and this is inconvenient.

If conversely, the lower limit value of conditional expression (13) is exceeded, spherical aberration will become very great to the positive side at the telephoto end and the lens diameter of the fourth lens unit G4 and subsequent lens unit will become large, and this is inconvenient.

A zoom lens system according to each embodiment of the present invention will hereinafter be described with reference to the drawings. The zoom lens system according to each embodiment has, in succession from the object side, a first lens unit G1 having positive refractive power, a second lens unit G2 having negative refractive power, a third lens unit G3 having positive or negative refractive power a fourth lens unit G4 having positive refractive power, and a fifth lens unit G5 having negative refractive power.

The zoom lens system according to each embodiment is designed such that during the focal-length change from the wide angle end to the telephoto end, the spacing between the first lens unit G1 and the second lens unit G2 is increased, the spacing between the second lens unit G2 and the third lens unit G3 is linearly or non-linearly varied and the spacing between the fourth lens unit G4 and the fifth lens unit G5 is decreased.

Further, in the zoom lens system according to each embodiment, the second lens unit G2 is designed to be movable along a direction substantially orthogonal to the optical axis thereof. Each embodiment is provided with a vibration reduction device 1 for moving the second lens unit G2. This vibration reduction device 1 may be, for example, one disclosed in commonly owned U.S. patent application Ser. No. 129,580 (filed on Sep. 30, 1993) now abandoned or U.S. patent application Ser. No. 131,939 (filed on Oct. 5, 1993,) now abandoned.

Each embodiment of the present invention will hereinafter be described with reference to the drawings.

[Embodiment 1]

FIG. 1 shows the construction of a zoom lens according to a first embodiment of the present invention. The zoom lens shown in FIG. 1 is comprised, in succession from the object side, a first lens unit G1 comprising a cemented lens consisting of a negative meniscus lens having its convex surface facing the object side and a biconvex lens, and a biconvex lens, a second lens unit G2 comprising a cemented lens consisting of a biconcave lens and a positive meniscus lens having its convex surface facing the object side, a third lens unit G3 comprising a cemented lens consisting of a biconcave lens and a biconvex lens, a fourth lens unit G4 comprising a cemented lens consisting of a biconvex lens and a negative meniscus lens having its concave surface facing the object side, and a cemented lens consisting of a biconvex lens and a negative meniscus lens having its concave surface facing the object side, and a fifth lens unit G5 comprising a cemented lens consisting of a biconvex lens and a biconcave lens. An aperture stop S is provided between the third lens unit G3 and the fourth lens unit G4.

FIG. 1 shows the positional relations among the lens units at the wide angle end, and during the focal-length change to the telephoto end, the lens units are moved on the optical axis along zooming loci indicated by arrows. However, the second lens unit G2 is fixed during zooming, and is suitably moved in a direction substantially orthogonal to the optical axis by the vibration reduction device 1 which is displacing means so that the shake of an image attributable to the vibration of the zoom lens may be corrected.

The values of the numerical data of Embodiment 1 of the present invention are given in Table 1 below. In Table 1, f represents the focal length, $F_{NO}$ represents the F-number, $2\omega$ represents the angle of field, and Bf represents the back focal length. Further, the numbers at the left end indicate the order of the lens surfaces from the object side, r indicates the radius of curvature of each lens surface, d indicates the spacing between adjacent lens surfaces, and n indicates the refractive index.

TABLE 1

| f = 76.5 ~ 150 | | |
|---|---|---|
| $F_{NO}$ = 4.62 ~ 5.63 | | |
| $2\omega$ = 32.56 ~ 15.96 | | |
| r | d | n |
| 1  280.061 | 2.000 | 1.79631 |
| 2   77.586 | 7.300 | 1.49782 |
| 3  −428.027 | 0.200 | |

TABLE 1-continued

| | | | |
|---|---|---|---|
| 4 | 87.627 | 6.500 | 1.51860 |
| 5 | −427.962 | (d5 = variable) | |
| 6 | −142.978 | 1.700 | 1.54814 |
| 7 | 22.745 | 5.500 | 1.62000 |
| 8 | 104.648 | (d8 = variable) | |
| 9 | −52.404 | 1.500 | 1.78797 |
| 10 | 56.961 | 3.600 | 1.64831 |
| 11 | −75.627 | (d11 = variable) | |
| 12 | 152.933 | 3.000 | 1.71700 |
| 13 | −43.246 | 1.600 | 1.86074 |
| 14 | −83.642 | 0.500 | |
| 15 | 71.466 | 4.500 | 1.62280 |
| 16 | −42.561 | 1.600 | 1.80384 |
| 17 | −150.924 | (d17 = variable) | |
| 18 | 156.427 | 3.700 | 1.80384 |
| 19 | −36.315 | 1.500 | 1.77279 |
| 20 | 33.124 | (Bf) | |

(Variable spacings in focal-length change)

| f | 76.500 | 150.000 |
|---|---|---|
| D0 | ∞ | ∞ |
| d5 | 2.053 | 25.928 |
| d8 | 4.134 | 20.131 |
| d11 | 55.356 | 23.734 |
| d17 | 30.166 | 21.916 |
| Bf | 41.518 | 65.393 |

(Condition-corresponding values)

f1 = 137.3
f2 = −151
fW = 76.5
fT = 150
R21 = −142.978
f2__ = −35.671

| (1) | $f1/(fW \cdot fT)^{1/2}$ | = 1.282 |
|---|---|---|
| (2) | $|f2|/f1$ | = 1.0998 |
| (3) | $|f2|/fW$ | = 1.974 |
| (4) | $\Delta S/|f2|$ | = 0.003565 |
| (5) | $R21/f2$ | = 0.94687 |
| (6) | $N_-$ | = 1.54814 |
| (7) | $f2\_/f2$ | = 0.2362 |
| (8) | $N+$ | = 1.62004 |
| (9) | q | = −0.7255 |
| (11) | $f4/|f5|$ | = 0.807 |
| (13) | $|f3|/fW$ | = 1.536 |

(Vibration reduction data)

| Amount of movement of second lens unit in direction | Wide angle end | Telephoto end |
|---|---|---|
| Orthogonal to optical axis (mm) | 0.5383 | 0.478 |
| Amount of movement of image (mm) | −0.255 | −0.35 |

[Embodiment 2]

Figure 2:
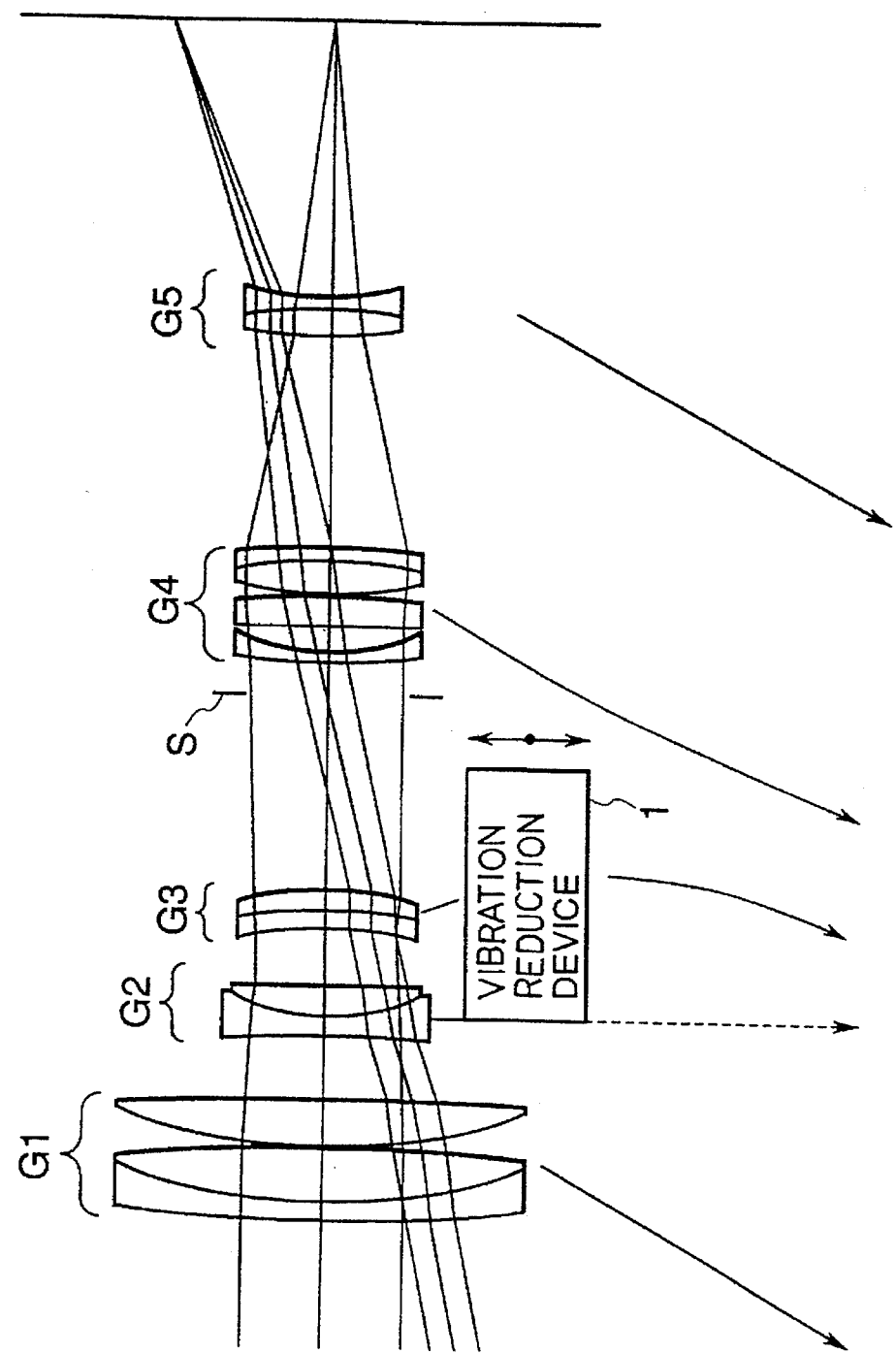
FIG. 2 shows the construction of a zoom lens system according to a second embodiment of the present invention.

FIG. 2 shows the construction of a zoom lens according to a second embodiment of the present invention. The zoom lens shown in FIG. 2 is comprised, in succession from the object side, of a first lens unit G1 comprising a cemented lens consisting of a negative meniscus lens having its convex surface facing the object side and a biconvex lens, and a biconvex lens, a second lens unit G2 comprising a cemented lens consisting of a biconcave lens and a positive meniscus lens having its convex surface facing the object side, a third lens unit G3 comprising a cemented lens consisting of a negative meniscus lens having its concave surface facing the object side and a negative meniscus lens having its concave surface facing the object side, a fourth lens unit G4 comprising a positive meniscus lens having its convex surface facing the object side, a biconvex lens and a cemented lens consisting of a biconvex lens and a negative meniscus lens having its concave surface facing the object side, and a fifth lens unit G5 comprising a cemented lens consisting of a biconvex lens and a biconcave lens. An aperture stop S is provided between the third lens unit G3 and the fourth lens unit G4.

FIG. 2 shows the positional relations among the lens units at the wide angle end, and during the focal-length change to the telephoto end, the lens units are suitably moved on the optical axis along zooming loci. However, the second lens unit G2 is fixed during zooming, and is suitably moved in a direction substantially orthogonal to the optical axis by the vibration reduction device 1 so that the shake of an image attributable to the vibration of the zoom lens may be corrected.

The zoom lens of Embodiment 2 is similar in basic construction to the zoom lens of Embodiment 1, but differs from the zoom lens of Embodiment 1 in the refractive power, shape, etc. of each lens unit.

The values of the numerical data of Embodiment 2 of the present invention are given in Table 2 below. In Table 2, f represents the focal length, $F_{NO}$ represents the F-number, $2\omega$ represents the angle of field, and Bf represents the back focal length. Further, the numbers at the left end indicate the order of the lens surfaces from the object side, r indicates the radius of curvature of each lens surface, d indicates the spacing between adjacent lens surfaces, and n indicates the refractive index.

TABLE 2 f = 100 ~ 292
$F_{NO}$ = 4.62 ~ 5.69
$2\omega$ = 23.32° ~ 8.18°

| | r | d | n |
|---|---|---|---|
| 1 | 244.826 | 2.000 | 1.80218 |
| 2 | 60.389 | 7.500 | 1.49782 |
| 3 | −477.858 | 0.200 | |
| 4 | 64.724 | 7.200 | 1.51860 |
| 5 | −515.076 | (d5 = variable) | |
| 6 | −1586.105 | 2.000 | 1.75692 |
| 7 | 23.033 | 3.600 | 1.80458 |
| 8 | 105.850 | (d8 = variable) | |
| 9 | −39.172 | 2.000 | 1.77279 |
| 10 | −112.696 | 2.300 | 1.80458 |
| 11 | −58.945 | (d11 = variable) | |
| 12 | 55.101 | 2.500 | 1.86074 |
| 13 | 31.581 | 3.000 | |
| 14 | 386.036 | 4.000 | 1.51860 |
| 15 | −104.239 | 0.500 | |
| 16 | 37.534 | 4.000 | 1.56384 |
| 17 | −33.568 | 1.500 | 1.67270 |
| 18 | −51.350 | (d18 = variable) | |
| 19 | 121.195 | 2.500 | 1.80458 |
| 20 | −39.387 | 1.800 | 1.80411 |
| 21 | 34.827 | (Bf) | |

(Variable spacings in focal-length change)

| f | 100.00 | 292.00 |
|---|---|---|
| D0 | ∞ | ∞ |
| d5 | 7.866 | 58.597 |
| d8 | 9.124 | 12.282 |
| d11 | 30.506 | 5.712 |
| d18 | 29.499 | 0.406 |
| Bf | 38.720 | 89.452 |

(Condition-corresponding values)

f1 = 120
f2 = −167
fW = 100
fT = 292
R21 = −1586.105
f2__ = −29.979

| (1) | $f1/(fW \cdot fT)^{1/2}$ | = 0.69363 |
|---|---|---|
| (2) | $|f2|/f1$ | = 1.3917 |
| (3) | $|f2|/fW$ | = 1.629293 |

TABLE 2-continued

| | | |
|---|---|---|
| (4) | $\Delta S/|f2|$ | = 0.005161 |
| (5) | R21/f2 | = 9.498 |
| (6) | N_ | = 1.75692 |
| (7) | f2_/f2 | = 0.17952 |
| (8) | N+ | = 1.80458 |
| (9) | q | = −0.97137 |
| (11) | f4/|f5| | = 1.06834 |
| (13) | |f3|/fW | = 1.716 |

(Vibration reduction data)

| Amount of movement of second lens unit in direction | Wide angle end | Telephoto end |
|---|---|---|
| Orthogonal to optical axis (mm) | 0.47472 | 0.86183 |
| Amount of movement of image (mm) | −0.255 | −0.68136 |

[Embodiment 3]

Figure 3:
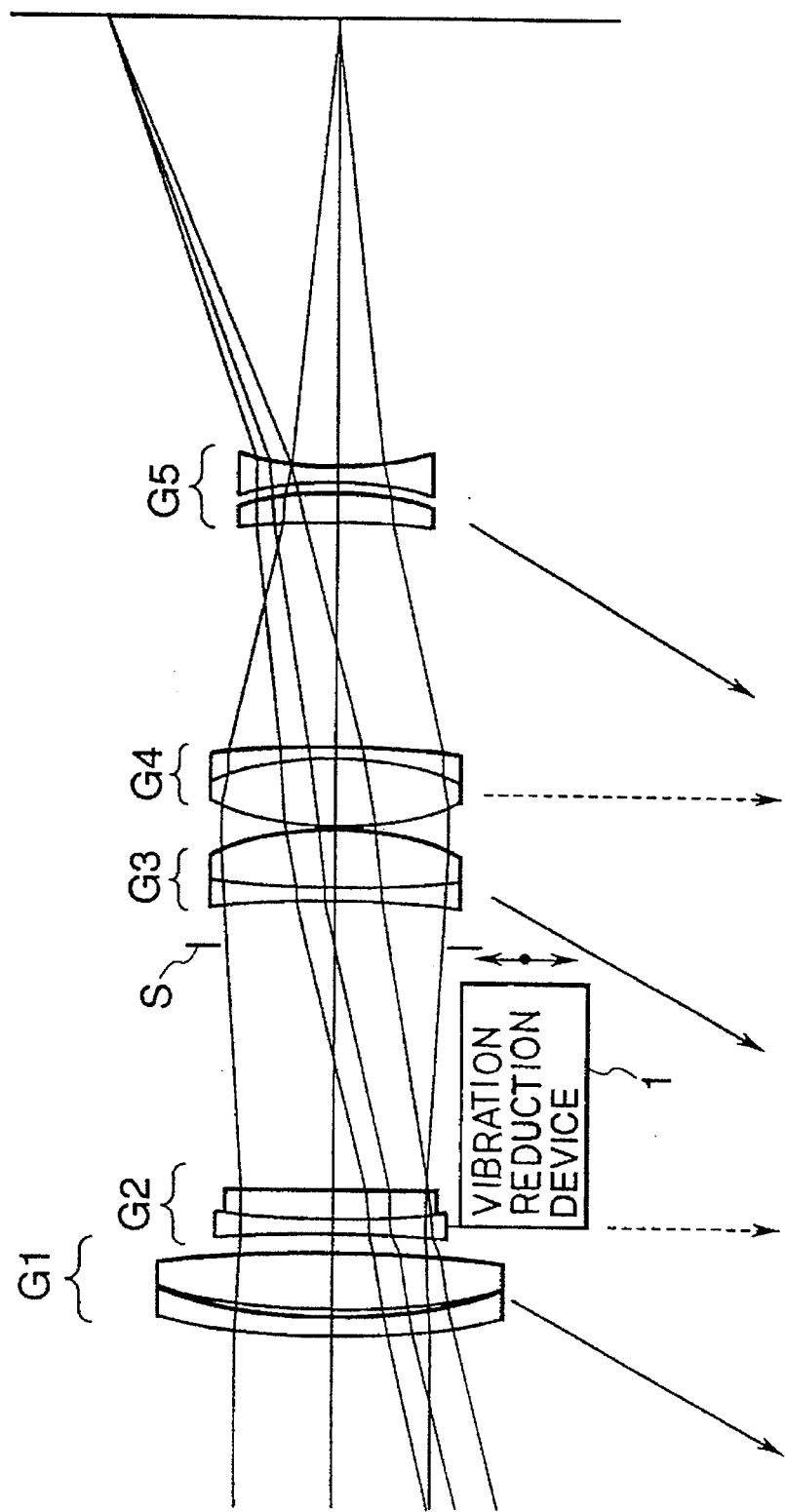
FIG. 3 shows the construction of a zoom lens system according to a third embodiment of the present invention.

FIG. 3 shows the construction of a zoom lens according to a third embodiment of the present invention. The zoom lens shown in FIG. 3 are comprised, in succession from the object side, of a first lens unit G1 comprising a negative meniscus lens having its convex surface facing the object side and a biconvex lens, a second lens unit G2 comprising a cemented lens consisting of a biconcave lens and a biconvex lens, a third lens unit G3 comprising a cemented lens consisting of a biconcave lens and a biconvex lens, a fourth lens unit G4 comprising a cemented lens consisting of a biconvex lens and a negative meniscus lens having its concave surface facing the object side, and a fifth lens unit G5 comprising a positive meniscus lens having its concave surface facing the object side and a biconcave lens. An aperture stop S is provided between the second lens unit G2 and the third lens unit G3.

FIG. 3 shows the positional relations among the lens units at the wide angle end, and during the focal-length change to the telephoto end, the lens units are moved on the optical axis along zooming loci indicated by arrows. However, the second lens unit G2 and the fourth lens unit G4 are fixed during zooming, and the second lens unit G2 is suitably moved in a direction substantially orthogonal to the optical axis by the vibration reduction device 1 so that the shake of an image attributable to the vibration of the zoom lens may be corrected.

The zoom lens of Embodiment 3 is similar in basic construction to the zoom lens of Embodiment 1, but differs from the zoom lens of Embodiment 1 in the refractive power, shape, etc. of each lens unit.

The values of the numerical data of Embodiment 3 of the present invention are given in Table 3 below. In Table 3, f represents the focal length, $F_{NO}$ represents the F-number, 2ω represents the angle of field, and Bf represents the back focal length. Further, the numbers at the left end indicate the order of the lens surfaces from the object side, r indicates the radius of curvature of each lens surface, d indicates the spacing between adjacent lens surfaces, and n indicates the refractive index.

TABLE 3 f = 83.2 ~ 166
$F_{NO}$ = 4.62 ~ 5.84
2ω = 28.92° ~ 14.28°

| | r | d | n |
|---|---|---|---|
| 1 | 52.733 | 1.800 | 1.79504 |
| 2 | 38.910 | 0.430 | |
| 3 | 41.785 | 5.300 | 1.59319 |
| 4 | −430.357 | (d4 = variable) | |
| 5 | −48.679 | 1.100 | 1.84042 |
| 6 | 35.750 | 3.000 | 1.80518 |
| 7 | −1346.158 | (d7 = variable) | |
| 8 | −166.474 | 1.100 | 1.84666 |
| 9 | 73.573 | 5.500 | 1.60311 |
| 10 | −32.325 | (d10 = variable) | |
| 11 | 32.688 | 5.800 | 1.53172 |
| 12 | −34.756 | 1.000 | 1.83400 |
| 13 | −104.388 | (d13 = variable) | |
| 14 | −128.191 | 2.800 | 1.80518 |
| 15 | −30.240 | 1.100 | |
| 16 | −28.083 | 1.200 | 1.77279 |
| 17 | 39.596 | (Bf) | |

(Variable spacings in focal-length change)

| f | 83.196 | 166.00 |
|---|---|---|
| D0 | ∞ | ∞ |
| d4 | 1.960 | 35.092 |
| d7 | 25.240 | 10.840 |
| d10 | 0.336 | 14.727 |
| d13 | 20.313 | 5.922 |
| Bf | 40.139 | 54.530 |

(Condition-corresponding values)

f1 = 97.233
f2 = −56.696
fW = 83.196
fT = 166
R21 = −48.680
f2_ = −24.3812

| | | |
|---|---|---|
| (1) | $f1/(fW \cdot fT)^{1/2}$ | = 1.209 |
| (2) | |f2|/f1 | = 0.583 |
| (3) | |f2|/fW | = 0.6815 |
| (4) | $\Delta S/|f2|$ | = 0.002998 |
| (5) | R21/f2 | = 0.859 |
| (6) | N_ | = 1.84042 |
| (7) | f2_/f2 | = 0.43003 |
| (8) | N+ | = 1.80518 |
| (9) | q | = −0.1531 |
| (11) | f4/|f5| | = 1.6643 |
| (12) | f3/fW | = 1.108 |

(Vibration reduction data)

| Amount of movement of second lens unit in direction | Wide angle end | Telephoto end |
|---|---|---|
| Orthogonal to optical axis (mm) | 0.15 | 0.17 |
| Amount of movement of image (mm) | −0.206 | −0.297 |

While in the present embodiment, the invention has been described with respect to a zoom lens of five-unit construction provided, in succession from the object side, with a first lens unit having positive refractive power, a second lens unit having negative refractive power, a third lens unit having positive or negative refractive power, a fourth lens unit having positive refractive power, and a fifth lens unit having negative refractive power, it is apparent that the present invention can also be applied to an ordinary zoom lens comprising a plurality of lens units provided, in succession from the object side, with a first lens unit having positive refractive power, and a second lens unit having negative refractive power.

Also, while in the present embodiment, the entire second lens unit is moved in the direction orthogonal to the optical axis by the vibration reduction device which is displacing means, it is apparent that the operational effect of the present invention is also achieved by moving only some lens groups or lenses in the second lens unit.

What is claimed is:

1. A zoom lens system with vibration reduction function including, in succession from an object side:

a first lens unit having positive refractive power;

a second lens unit movable along a direction across an optical axis thereof and having negative refractive power;

a third lens unit;

a fourth lens unit having positive refractive power;

a fifth lens unit having negative refractive power;

during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;

a vibration reduction device for moving said second lens unit in the direction across said optical axis;

the stabilization of an image on an image plane being accomplished by the movement of said second lens unit caused by said vibration reduction device; and wherein the following condition is satisfied:

$$0.3 < f1/(fW \cdot fT)^{1/2} < 1.5,$$

where f1: the focal length of said first lens unit;

fW: the focal length of the whole zoom lens system at said wide angle end;

fT: the focal length of the whole zoom lens system at said telephoto end, and wherein said second lens unit includes a cemented lens component having, in succession from the object side, a concave lens element and a convex lens element, and satisfies the following condition:

$$N+ < 1.55,$$

where N+ is the refractive index of said convex lens element.

2. A zoom lens system with vibration reduction function according to claim 1, satisfying the following condition:

$$0.3 < |f2|/f1 < 5,$$

where is the focal length of said second lens unit.

3. A zoom lens system with vibration reduction function according to claim 1, satisfying the following condition:

$$0.3 < |f2|/fW < 3,$$

where f2: the focal length of said second lens unit.

4. A zoom lens system with vibration reduction function according to claim 1, satisfying the following conditions:

$$\Delta S/|f2| < 0.1,$$

where f2: the focal length of said second lens unit;

$\Delta S$: a maximum amount of displacement which can be assumed by said second lens unit for the stabilization of said image.

5. A zoom lens system with vibration reduction function according to claim 1, satisfying the following condition:

$$0.2 < R21/f2 < 20,$$

where f2: the focal length of said second lens unit;

R21: the radius of curvature of that lens surface in said second lens unit which is positioned most adjacent to the object side.

6. A zoom lens system with vibration reduction function according to claim 1, satisfying the following condition:

$$Z/T < 4,$$

where

T: the amount of movement of said second lens unit when the stabilization of said image is effected;

Z: the amount of movement of the image corresponding to the amount of movement of said second lens unit.

7. A zoom lens system with vibration reduction function according to claim 1, wherein said concave lens element is positioned most adjacent to the object side in said second lens unit, and the following condition is satisfied:

$$1.52 < N-,$$

where N- is the refractive index of said concave lens element.

8. A zoom lens system with vibration reduction function according to claim 1, wherein said concave lens element is positioned most adjacent to the object side in said second lens unit, and the following condition is satisfied:

$$0.1 < f2-/f2 < 0.7,$$

where f2- is the focal length of said concave lens element, and f2 is the focal length of said second lens unit.

9. A zoom lens system with vibration reduction function according to claim 1, wherein said second lens unit is fixed during the focal-length change from the wide angle end to the telephoto end.

10. A zoom lens system with vibration reduction function according to claim 1, satisfying the following condition:

$$-2 < q < 0$$

$$q = (rb + ra)/(rb - ra)$$

where ra is the radius of curvature of the object side lens surface of said cemented lens component, and rb is the radius of curvature of the image side lens surface of said cemented lens component.

11. A zoom lens system with vibration reduction function according to claim 1, having a flare stop disposed on the image side of said second lens unit, said flare stop being fixed with respect to the direction across the optical axis.

12. A zoom lens system with vibration reduction function including, in succession from an object side:

a first lens unit having positive refractive power;

a second lens unit movable along a direction across an optical axis thereof and having negative refractive power;

a third lens unit;

a fourth lens unit having positive refractive power;

a fifth lens unit having negative refractive power;

during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;

a vibration reduction device for moving said second lens unit in the direction across said optical axis;

the stabilization of an image on an image plane being accomplished by the movement of said second lens unit caused by said vibration reduction device; and wherein the following condition is satisfied:

$$0.3 < |f2|/f1 < 5,$$

where f1 is the focal length of said first lens unit, and f2 is the focal length of said second lens unit, and wherein said second lens unit includes a cemented lens component having, in succession from the object side, a concave lens element and a convex lens element, and satisfies the following condition:

$$N+ < 1.55,$$

where N+ is the refractive index of said convex lens element.

13. A zoom lens system with vibration reduction function according to claim 12 satisfying the following condition:

$$0.3 < |f2|/fW < 3,$$

where fW: the focal length of the whole zoom lens system at said wide angle end.

14. A zoom lens system with vibration reduction function according to claim 12, satisfying the following condition:

$$\Delta S/|f2| < 0.1,$$

where $\Delta S$: a maximum amount of displacement which can be assumed by said second lens unit for the stabilization of said image.

15. A zoom lens system with vibration reduction function according to claim 12, satisfying the following condition:

$$0.2 < R21/f2 < 20,$$

where

R21: the radius of curvature of that lens surface in said second lens unit which is positioned most adjacent to the object side.

16. A zoom lens system with vibration reduction function according to claim 12, satisfying the following condition:

$$Z/T < 4,$$

where

T: the amount of movement of said second lens unit when the stabilization of said image is effected;

Z: the amount of movement of the image corresponding to the amount of movement of said second lens unit.

17. A zoom lens system with vibration reduction function according to claim 12, wherein said concave lens element is positioned most adjacent to the object side in said second lens unit, and the following condition is satisfied:

$$1.52 < N-,$$

where N− is the refractive index of said concave lens element.

18. A zoom lens system with vibration reduction function according to claim 12, wherein said concave lens element is positioned most adjacent to the object side in said second lens unit, and the following condition is satisfied:

$$0.1 < f2-/f2 < 0.7,$$

where f2− is the focal length of said concave lens element.

19. A zoom lens system with vibration reduction function according to claim 12, wherein said second lens unit is fixed during the focal-length change from the wide angle end to the telephoto end.

20. A zoom lens system with vibration reduction function according to claim 12, satisfying the following condition:

$$-2 < q < 0$$

$$q = (rb+ra)/(rb-ra)$$

where ra is the radius of curvature of the object side lens surface of said cemented lens component and rb is the radius of curvature of the image side lens surface of said cemented lens component.

21. A zoom lens system with vibration reduction function according to claim 12, having a flare stop disposed on the image side of said second lens unit said flare stop being fixed with respect to the direction across the optical axis.

22. A zoom lens system with vibration reduction function including, in succession from an object side:

a first lens unit having positive refractive power;

a second lens unit movable along a direction across an optical axis thereof and having negative refractive power; a third lens unit;

a fourth lens unit having positive refractive power;

a fifth lens unit having negative refractive power;

during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;

a vibration reduction device for moving said second lens unit in the direction across said optical axis;

the stabilization of an image on an image plane being accomplished by the movement of said second lens unit caused by said vibration reduction device; and wherein the following condition is satisfied:

$$\Delta S/|f2| < 0.1,$$

where f2: the focal length of said second lens unit;

$\Delta S$: a maximum amount of displacement which can be assumed by said second lens unit for the stabilization of said image, and wherein said second lens unit includes a cemented lens component having, in succession from the object side, a concave lens element and a convex lens element, and satisfies the following condition:

$$N+ < 1.55,$$

where N+ is the refractive index of said convex lens element.

23. A zoom lens system with vibration reduction function according to claim 22, satisfying the following condition:

$$0.2 < R21/f2 < 20,$$

where

R21: the radius of curvature of that lens surface in said second lens unit which is positioned most adjacent to the object side.

24. A zoom lens system with vibration reduction function according to claim 22, satisfying the following condition:

$$Z/T < 4,$$

where
T: the amount of movement of said second lens unit when the stabilization of said image is effected;
Z: the amount of movement of the image corresponding to the amount of movement of said second lens unit.

25. A zoom lens system with vibration reduction function according to claim 22, wherein said concave lens element is positioned most adjacent to the object side in said second lens unit, and the following condition is satisfied:

$$1.52 < N-,$$

where $N-$ is the refractive index of said concave lens element.

26. A zoom lens system with vibration reduction function according to claim 22, wherein said concave lens element is positioned most adjacent to the object side in said second lens unit, and the following condition is satisfied:

$$0.1 < f2 - /f2 < 0.7,$$

where $f2-$ is the focal length of said concave lens element.

27. A zoom lens system with vibration reduction function according to claim 22, wherein said second lens unit is fixed during the focal-length change from the wide angle end to the telephoto end.

28. A zoom lens system with vibration reduction function according to claim 22, satisfying the following condition:

$$-2 < q < 0$$

$$q = (rb+ra)/(rb-ra)$$

where ra is the radius of curvature of the object side lens surface of said cemented lens component, and rb is the radius of curvature of the image side lens surface of said cemented lens component.

29. A zoom lens system with vibration reduction function according to claim 22, having a flare stop disposed on the image side of said second lens unit, said flare stop being fixed with respect to the direction across the optical axis.

30. A zoom lens system with vibration reduction function including, in succession from an object side:
  a second lens unit movable along a direction across an optical axis thereof and having negative refractive power;
  a third lens unit;
  a fourth lens unit having positive refractive power;
  a fifth lens unit having negative refractive power;
  during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;
  a vibration reduction device for moving said second lens unit in the direction across said optical axis;
  the stabilization of an image on an image plane being accomplished by the movement of said second lens unit caused by said vibration reduction device; and
  wherein the following condition is satisfied:

$$0.2 < R21/f2 < 20,$$

where
  f2: the focal length of said second lens unit;
  R21: the radius of curvature of that lens surface in said second lens unit which is positioned most adjacent to the object side, and wherein said second lens unit includes a cemented lens component having, in succession from the object side, a concave lens element and a convex lens element, and satisfies the following condition:

$$N+ < 1.55,$$

where $N+$ is the refractive index of said convex lens element.

31. A zoom lens system with vibration reduction function according to claim 30, satisfying the following condition:

$$Z/T < 4,$$

where
T: the amount of movement of said second lens unit when the stabilization of said image is effected;
Z: the amount of movement of the image corresponding to the amount of movement of said second lens unit.

32. A zoom lens system with vibration reduction function according to claim 30, wherein said concave lens element is positioned most adjacent to the object side in said second lens unit, and the following condition is satisfied:

$$1.52 < N-,$$

where $N-$ is the refractive index of said concave lens element.

33. A zoom lens system with vibration reduction function according to claim 30, wherein said concave lens element is positioned most adjacent to the object side in said second lens unit, and the following condition is satisfied:

$$0.1 < f2 - /f2 < 0.7,$$

where $f2-$ is the focal length of said concave lens element.

34. A zoom lens system with vibration reduction function according to claim 30, unit is fixed during the focal-length change from the wide angle end to the telephoto end.

35. A zoom lens system with vibration reduction function according to claim 30, satisfying the following condition:

$$-2 < q < 0$$

$$q = (rb+ra)/(rb-ra)$$

where ra is the radius of curvature of the object side lens surface of said cemented lens component, and rb is the radius of curvature of the image side lens surface of said cemented lens component.

36. A zoom lens system with vibration reduction function according to claim 30, having a flare stop disposed on the image side of said second lens unit, said flare stop being fixed with respect to the direction across the optical axis.

37. A zoom lens system with vibration reduction function including, in succession from an object side:
  a first lens unit having positive refractive power;
  a second lens unit movable along a direction across an optical axis thereof and having negative refractive power;
  a third lens unit;
  a fourth lens unit having positive refractive power;
  a fifth lens unit having negative refractive power;
  during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;

a vibration reduction device for moving said second lens unit in the direction across said optical axis;

the stabilization of an image on an image plane being accomplished by the movement of said second lens unit caused by said vibration reduction device; and wherein said second lens unit includes a cemented lens component having, in succession from the object side, a concave lens element and a convex lens element, and the following condition is satisfied:

$$0.1 < f2-/f2 < 0.7,$$

where f2− is the focal length of said concave lens element, and f2 is the focal length of said second lens unit, and wherein the following condition is satisfied:

$$N+ < 1.55,$$

where N+ is the refractive index of said convex lens element.

38. A zoom lens system with vibration reduction function according to claim 37, wherein said second lens unit is fixed during the focal-length change from the wide angle end to the telephoto end.

39. A zoom lens system with vibration reduction function according to claim 37, having a flare stop disposed on the image side of said second lens unit, said flare stop being fixed with respect to the direction across the optical axis.

40. A zoom lens system with vibration reduction function including, in succession from an object side:

a first lens unit having positive refractive power;

a second lens unit movable along a direction across an optical axis thereof and having negative refractive power;

a third lens unit;

a fourth lens unit having positive refractive power;

a fifth lens unit having negative refractive power;

during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;

a vibration reduction device for moving said second lens unit in the direction across said optical axis;

the stabilization of an image on an image plane being accomplished by the movement of said second lens unit caused by said vibration reduction device; and wherein said second lens unit includes a cemented lens component having, in succession from the object side, a concave lens element and a convex lens element, and satisfies the following condition:

$$-2 < q < 0$$

$$q = (rb+ra)/(rb-ra)$$

where ra is the radius of curvature of the object side lens surface of said cemented lens component, and rb is the radius of curvature of the image side lens surface of said cemented lens component, and wherein the following condition is satisfied:

$$0.1 < f2-/f2 < 0.7,$$

where f2− is the focal length of said concave lens element, and f2 is the focal length of said second lens unit.

41. A zoom lens system with vibration reduction function including, in succession from an object side:

a first lens unit having positive refractive power;

a second lens unit movable along a direction across an optical axis thereof and having negative refractive power;

a third lens unit;

a fourth lens unit having positive refractive power;

a fifth lens unit having negative refractive power;

during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;

a vibration reduction device for moving said second lens unit in the direction across said optical axis;

the stabilization of an image on an image plane being accomplished by the movement of said second lens unit caused by said vibration reduction device; and wherein said second lens unit includes a cemented lens component having, in succession from the object side, a concave lens element and a convex lens element, and satisfies the following condition:

$$N+ < 1.55,$$

where N+ is the refractive index of said convex lens element.

42. A zoom lens system with vibration reduction function according to claim 41, wherein said second lens unit is fixed during the focal-length change from the wide angle end to the telephoto end.

43. A zoom lens system with vibration reduction function according to claim 41, satisfying the following condition:

$$-2 < q < 0$$

$$q = (rb+ra)/(rb-ra)$$

where ra is the radius of curvature of the object side lens surface of said cemented lens component, and rb is the radius of curvature of the image side lens surface of said cemented lens component.

44. A zoom lens system with vibration reduction function including, in succession from an object side:

a first lens unit having positive refractive power;

a second lens unit movable along a direction across an optical axis thereof and having negative refractive power;

a third lens unit;

a fourth lens unit having positive refractive power;

a fifth lens unit having negative refractive power;

during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;

a vibration reduction device for moving said second lens unit in the direction across said optical axis;

the stabilization of an image on an image plane being accomplished by the movement of said second lens unit caused by said vibration reduction device; and wherein the following condition is satisfied:

$$0.3 < f1/(fW \cdot fT)^{1/2} < 1.5,$$

where
- f1: the focal length of said first lens unit;
- fW: the focal length of the whole zoom lens system at said wide angle end;
- fT: the focal length of the whole zoom lens system at said telephoto end, and wherein said second lens unit includes a cemented lens component having, in succession from the object side, a concave lens element and a convex lens element, and satisfies the following condition:

$$-2 < q < 0$$

$$q = (rb+ra)/(rb-ra)$$

where ra is the radius of curvature of the object side lens surface of said cemented lens component, and rb is the radius of curvature of the image side lens surface of said cemented lens component.

45. A zoom lens system with vibration reduction function according to claim 44, satisfying the following condition:

$$0.3 < |f2|/f1 < 5,$$

where f2 is the focal length of said second lens unit.

46. A zoom lens system with vibration reduction function according to claim 44, satisfying the following condition:

$$0.3 < |f2|/fW < 3,$$

where
- f2 : the focal length of said second lens unit.

47. A zoom lens system with vibration reduction function according to claim 44, satisfying the following condition:

$$\Delta S/|f2| < 0.1,$$

where
- f2: the focal length of said second lens unit;
- $\Delta S$: a maximum amount of displacement which can be assumed by said second lens unit for the stabilization of said image.

48. A zoom lens system with vibration reduction function according to claim 44, satisfying the following condition:

$$0.2 < R21/f2 < 20,$$

where
- f2 : the focal length of said second lens unit;
- R21: the radius of curvature of that lens surface in said second lens unit which is positioned most adjacent to the object side.

49. A zoom lens system with vibration reduction function according to claim 44, satisfying the following condition:

$$Z/T < 4,$$

where
- T: the amount of movement of said second lens unit when the stabilization of said image is effected;
- Z: the amount of movement of the image corresponding to the amount of movement of said second lens unit.

50. A zoom lens system with vibration reduction function according to claim 44, wherein said concave lens element is positioned most adjacent to the object side in said second lens unit, and the following condition is satisfied:

$$1.52 < N-,$$

where N- is the refractive index of said concave lens element.

51. A zoom lens system with vibration reduction function according to claim 44, wherein said concave lens element is positioned most adjacent to the object side in said second lens unit, and the following condition is satisfied:

$$0.1 < f2-/f2 < 0.7,$$

where f2- is the focal length of said concave lens element, and f2 is the focal length of said second lens unit.

52. A zoom lens system with vibration reduction function according to claim 44, wherein said second lens unit is fixed during the focal-length change from the wide angle end to the telephoto end.

53. A zoom lens system with vibration reduction function according to claim 44, having a flare stop disposed on the image side of said second lens unit, said flare stop being fixed with respect to the direction across the optical axis.

54. A zoom lens system with vibration reduction function including, in succession from an object side:
- a first lens unit having positive refractive power;
- a second lens unit movable along a direction across an optical axis thereof and having negative refractive power;
- a third lens unit;
- a fourth lens unit having positive refractive power;
- a fifth lens unit having negative refractive power;
- during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;
- a vibration reduction device for moving said second lens unit in the direction across said optical axis;
- the stabilization of an image on an image plane being accomplished by the movement of said second lens unit caused by said vibration reduction device; and wherein the following condition is satisfied:

$$0.3 < |f2|/f1 < 5,$$

where f1 is the focal length of said first lens unit, and f2 is the focal length of said second lens unit, and wherein said second lens unit includes a cemented lens component having, in succession from the object side, a concave lens element and a convex lens element, and satisfies the following condition:

$$-2 < q - 0$$

$$q = (rb+ra)/(rb-ra)$$

where ra is the radius of curvature of the object side lens surface of said cemented lens component, and rb is the radius of curvature of the image side lens surface of said cemented lens component.

55. A zoom lens system with vibration reduction function according to claim 54, satisfying the following condition:

$$0.3 < |f2|/fW < 3,$$

where
- fW: the focal length of the whole zoom lens system at said wide angle end.

56. A zoom lens system with vibration reduction function according to claim 54, satisfying the following condition:

where
ΔS: a maximum amount of displacement which can be assumed by said second lens unit for the stabilization of said image.

57. A zoom lens system with vibration reduction function according to claim 54, satisfying the following condition:

$$0.2 < R21/f2 < 20,$$

where
R21: the radius of curvature of that lens surface in said second lens unit which is positioned most adjacent to the object side.

58. A zoom lens system with vibration reduction function according to claim 54, satisfying the following condition:

$$Z/T < 4,$$

where
T: the amount of movement of said second lens unit when the stabilization of said image is effected;
Z: the amount of movement of the image corresponding to the amount of movement of said second lens unit.

59. A zoom lens system with vibration reduction function according to claim 54, wherein said concave lens element is positioned most adjacent to the object side in said second lens unit, and the following condition is satisfied:

$$1.52 < N-,$$

where N− is the refractive index of said concave lens element.

60. A zoom lens system with vibration reduction function according to claim 54, wherein said concave lens element is positioned most adjacent to the object side in said second lens unit, and the following condition is satisfied:

$$0.1 < f2-/f2 < 0.7,$$

where f2− is the focal length of said concave lens element.

61. A zoom lens system with vibration reduction function according to claim 54, wherein said second lens unit is fixed during the focal-length change from the wide angle end to the telephoto end.

62. A zoom lens system with vibration reduction function according to claim 54, having a flare stop disposed on the image side of said second lens unit, said flare stop being fixed with respect to the direction across the optical axis.

63. A zoom lens system with vibration reduction function including, in succession from an object side:
a first lens unit having positive refractive power;
a second lens unit movable along a direction across an optical axis thereof and having negative refractive power;
a third lens unit;
a fourth lens unit having positive refractive power;
a fifth lens unit having negative refractive power;
during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;
a vibration reduction device for moving said second lens unit in the direction across said optical axis;
the stabilization of an image on an image plane being accomplished by the movement of said second lens unit caused by said vibration reduction device; and
wherein the following condition is satisfied:

$$\Delta S/f2 < 0.1,$$

where
f2: the focal length of said second lens unit;
ΔS: a maximum amount of displacement which can be assumed by said second lens unit for the stabilization of said image, and wherein said second lens unit includes a cemented lens component having, in succession from the object side, a concave lens element and a convex lens element, and satisfies the following condition:

$$-2 < q < 0$$

$$q = (rb + ra)/(rb - ra)$$

where ra is the radius of curvature of the object side lens surface of said cemented lens component, and rb is the radius of curvature of the image side lens surface of said cemented lens component.

64. A zoom lens system with vibration reduction function according to claim 63, satisfying the following condition:

$$0.2 < R21/f2 < 20,$$

where
R21: the radius of curvature of that lens surface in said second lens unit which is positioned most adjacent to the object side.

65. A zoom lens system with vibration reduction function according to claim 63, satisfying the following condition:

$$Z/T < 4,$$

where
T: the amount of movement of said second lens unit when the stabilization of said image is effected;
Z: the amount of movement of the image corresponding to the amount of movement of said second lens unit.

66. A zoom lens system with vibration reduction function according to claim 63, wherein said concave lens element is positioned most adjacent to the object side in said second lens unit, and the following condition is satisfied:

$$1.52 < N-,$$

where N− is the refractive index of said concave lens element.

67. A zoom lens system with vibration reduction function according to claim 63, wherein said concave lens element is positioned most adjacent to the object side in said second lens unit, and the following condition is satisfied:

$$0.1 < f2-/f2 < 0.7,$$

where f2− is the focal length of said concave lens element.

68. A zoom lens system with vibration reduction function according to claim 63, wherein said second lens unit is fixed during the focal-length change from the wide angle end to the telephoto end.

69. A zoom lens system with vibration reduction function according to claim 63, having a flare stop disposed on the image side of said second lens unit, said flare stop being fixed with respect to the direction across the optical axis.

70. A zoom lens system with vibration reduction function including, in succession from an object side:
   a first lens unit having positive refractive power;
   a second lens unit movable along a direction across an optical axis thereof and having negative refractive power;
   a third lens unit;
   a fourth lens unit having positive refractive power;
   a fifth lens unit having negative refractive power;
   during a focal-length change from the wide angle end to the telephoto end, spacing between said first lens unit and said second lens unit being increased, spacing between said second lens unit and said third lens unit being varied, and spacing between said fourth lens unit and said fifth lens unit being decreased;
   a vibration reduction device for moving said second lens unit in the direction across said optical axis;
   the stabilization of an image on an image plane being accomplished by the movement of said second lens unit caused by said vibration reduction device; and
   wherein the following condition is satisfied:

$0.2 < R21/f2 < 20,$ where
   f2: the focal length of said second lens unit;
   R21: the radius of curvature of that lens surface in said second lens unit which is positioned most adjacent to the object side, and
   wherein said second lens unit includes a cemented lens component having, in succession from the object side, a concave lens element and a convex lens element, and satisfies the following condition:

$-2 < q < 0$ $q = (rb+ra)/(rb-ra)$ where ra is the radius of curvature of the object side lens surface of said cemented lens component, and rb is the radius of curvature of the image side lens surface of said cemented lens component.

71. A zoom lens system with vibration reduction function according to claim 70, satisfying the following condition:

$Z/T < 4,$ where
   T: the amount of movement of said second lens unit when the stabilization of said image is effected;
   Z: the amount of movement of the image corresponding to the amount of movement of said second lens unit.

72. A zoom lens system with vibration reduction function according to claim 70, wherein said concave lens element is positioned most adjacent to the object side in said second lens unit, and the following condition is satisfied:

$1.52 < N-,$ where $N-$ is the refractive index of said concave lens element.

73. A zoom lens system with vibration reduction function according to claim 70, wherein said concave lens element is positioned most adjacent to the object side in said second lens unit, and the following condition is satisfied:

$0.1 < f2-/f2 < 0.7,$ where $f2-$ is the focal length of said concave lens element.

74. A zoom lens system with vibration reduction function according to claim 70, wherein said second lens unit is fixed during the focal-length change from the wide angle end to the telephoto end.

75. A zoom lens system with vibration reduction function according to claim 70, having a flare stop disposed on the image side of said second lens unit, said flare stop being fixed with respect to the direction across the optical axis.

* * * * *